US012630222B2

(12) United States Patent
Eiche et al.

(10) Patent No.: US 12,630,222 B2
(45) Date of Patent: May 19, 2026

(54) METHOD FOR ALIGNED PARKING OF A TRAILER

(71) Applicant: Robert Bosch GmbH, Stuttgart (DE)

(72) Inventors: Jacob Eiche, Munich (DE); Udo Schulz, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 184 days.

(21) Appl. No.: 18/578,111

(22) PCT Filed: Jul. 19, 2022

(86) PCT No.: PCT/EP2022/070190
§ 371 (c)(1),
(2) Date: Jan. 10, 2024

(87) PCT Pub. No.: WO2023/001819
PCT Pub. Date: Jan. 26, 2023

(65) Prior Publication Data
US 2024/0317312 A1     Sep. 26, 2024

(30) Foreign Application Priority Data

Jul. 20, 2021    (DE) ..................... 10 2021 207 756.0

(51) Int. Cl.
*B62D 15/02* (2006.01)
*B60L 15/20* (2006.01)
(Continued)

(52) U.S. Cl.
CPC .......... *B62D 15/0285* (2013.01); *B60L 15/20* (2013.01); *B60W 30/06* (2013.01); (Continued)

(58) Field of Classification Search
None
See application file for complete search history.

(56) References Cited

U.S. PATENT DOCUMENTS

| | | | | |
|---|---|---|---|---|
| 9,616,923 B2* | 4/2017 | Lavoie | .................. | B60W 10/10 |
| 9,902,425 B2* | 2/2018 | Singh | .................... | B62D 13/06 |

(Continued)

FOREIGN PATENT DOCUMENTS

| | | |
|---|---|---|
| DE | 112018005131 T5 | 6/2020 |
| GB | 2568751 A | 5/2019 |

OTHER PUBLICATIONS

International Search Report for PCT/EP2022/070190, Issued Nov. 7, 2022.

*Primary Examiner* — Todd Melton
(74) *Attorney, Agent, or Firm* — NORTON ROSE FULBRIGHT US LLP

(57) ABSTRACT

A method for aligned parking of a trailer. The method includes: determining a topography of a ground surface of an environment of the trailer; determining a distance of contact points of at least two wheels of an axle of the trailer; determining at least one pair of target positions on the ground surface of the environment of the trailer, for transversely aligned parking of the trailer, on the basis of the distance of the contact points of the at least two wheels of the axle of the trailer and the topography of the ground surface of the environment of the trailer; and providing the at least one pair of target positions, for aligned parking of the trailer.

10 Claims, 1 Drawing Sheet

(51) Int. Cl.
    *B60W 30/06*            (2006.01)
    *B60W 30/18*            (2012.01)
    *B62D 13/06*            (2006.01)

(52) U.S. Cl.
    CPC ....... *B60W 30/18036* (2013.01); *B62D 13/06*
                (2013.01); *B60L 2200/28* (2013.01); *B60L*
                                            *2250/16* (2013.01)

(56)                    References Cited

U.S. PATENT DOCUMENTS

2018/0362026  A1    12/2018  Heimberger et al.
2020/0247471  A1     8/2020  Grodde

* cited by examiner

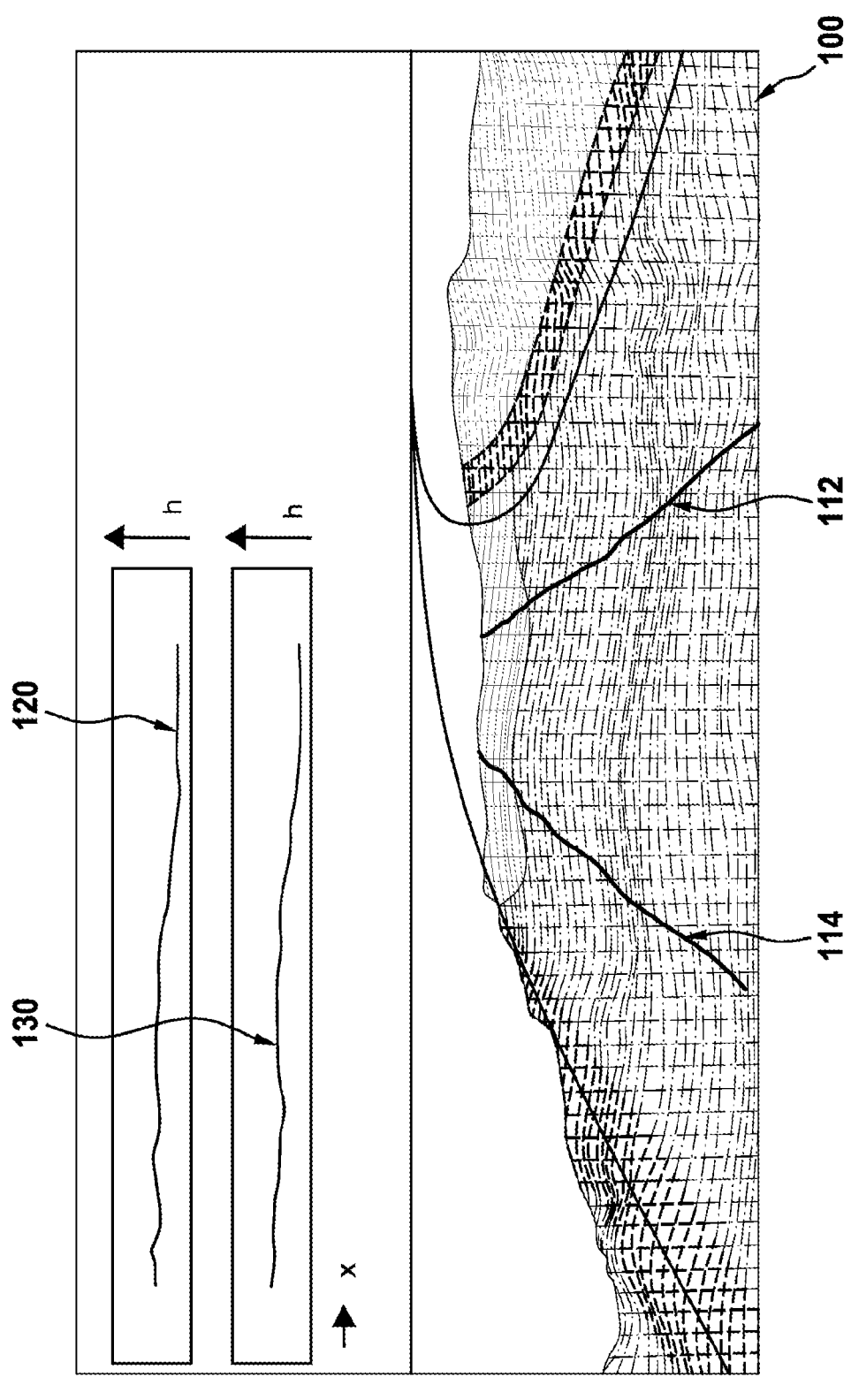

METHOD FOR ALIGNED PARKING OF A TRAILER

BACKGROUND INFORMATION

Trailers of towing vehicles and in particular campers should be aligned horizontally for parking, in particular with respect to a transverse axis, in order to be able to achieve a desired comfort. According to the related art, this can take place through measures that compensate for the ground, after the trailer has been set up.

SUMMARY

An object of the present invention is to support a search for the most horizontal ground possible for wheels of at least one axle of a trailer in a ground topography of an environment in which the trailer, and in particular a camper, is to be parked.

The present invention provides a method for aligned parking of a trailer and a system for aligned parking of a trailer. Advantageous embodiments of the present invention are disclosed herein.

Throughout this description of the present invention, the sequence of method steps is shown in such a way that the method is easy to understand. However, a person skilled in the art will recognize that many of the method steps can also be run through in a different order and produce the same result. In this sense, the order of the method steps can be changed accordingly and is thus also disclosed.

According to one aspect of the present invention, a method for aligned parking of a trailer is proposed. According to an example embodiment of the present invention, in one step, a topography of a ground surface of an environment of the trailer is determined. In a further step, a distance of contact points of at least two wheels of an axle of the trailer is determined. In a further step, at least one pair of target positions on the ground surface of the environment of the trailer is determined in order to park the trailer aligned transversely on the basis of the distance of the contact points of the at least two wheels of the axle of the trailer and the topography of the ground surface of the environment of the trailer. In a further step, the at least one pair of target positions is provided for aligned parking of the trailer.

In other words, the provided method of the present invention for aligned parking enables a search and display of at least one parking space with a pair of target positions, and in particular of trajectories to the parking space with the pair of target positions, for horizontal parking of trailers. In particular, the axle of the trailer can be a rear axle of a camper.

The topography of the ground surface, i.e., in particular an elevation map, of an environment of the trailer can be determined with the method by means of optical images, e.g., a stereo camera, or a multitude of optical images according to a structure-by-motion method. Alternatively or additionally, the topography can be determined with radar images or lidar images of the ground surface of the environment of the trailer.

According to an example embodiment of the present invention, when using a mobile device, e.g., a smartphone, for determining the topography of the ground surface, the position and pose of the mobile device in the topography must also be determined. For this purpose, camera systems and acceleration and rotation rate sensors of the smartphone can be used to determine the self-movement.

The sensor principle of an optical camera requires that, for example, as a result of covering higher grass, a fixed ground of the environment of the trailer cannot be reliably imaged from a lateral perspective in order to determine the topography of the ground surface. Then, in particular with a mobile device, vertical optical images can be generated from a plan view of the ground surface, and deepest points can be identified with these optical images, and an extrapolated ground map can be created. Such a mobile device with an optical camera can be a smartphone, for example. In order to create the topography of the ground surface for a topographic map, a user of the method can manually scan an intended maneuver route and/or a desired parking area of the trailer by means of such vertical images. The mobile device can then display regions with suitable contact points and/or trajectories to these contact points by means of a display. Thus, the method ultimately generates trajectories and/or regions with contact points that are as horizontal as possible, which can be displayed with a display. By pattern or image recognition, the, for example mobile, device can recognize high grass and preclude areas with high grass as contact points or target positions.

In order to generate optical images of the environment, camera systems, or imaging sensors, can be mechanically coupled to a towing vehicle of the trailer and/or can be mechanically coupled to the trailer, and/or stationary camera systems, i.e., infrastructure camera systems, which image the corresponding environment of the trailer, can generate the optical images for determining the topography of the ground surface.

Alternatively or additionally, the camera systems can be integrated into mobile devices in order to use them for determining and/or generating the topography of the ground surface, or an elevation map, of an environment of the trailer.

By means of the camera systems and algorithms for image processing and object recognition and classification, according to the method of an example embodiment of the present invention, a three-dimensional topography of the ground surface, i.e., in particular the topography of an uneven ground, can be generated or determined.

This three-dimensional topography can be represented on a display two-dimensionally, e.g., in a plan view of the environment, and/or three-dimensionally. Such a representation can be fused with data indicating a location and an orientation, or pose, of the trailer and/or location and pose of the camera system. These data can be stored and/or represented together with the topography in a two-dimensional or three-dimensional map.

Based on the topography of the ground surface of the environment of the trailer, a target position for the trailer can be identified with the distance of the contact points of the wheels of the axle by searching the topography of the environment for two points that have the distance of the contact points and have the smallest possible elevation difference.

According to an example embodiment of the present invention, prior to identifying a target position, a desired position and pose of the trailer with the external outlines of the trailer can also be specified in a larger region, for the method for aligned parking, in a map of the topography of the ground surface. This can be specified, for example, by manual input by means of a plan view of the map of the topography of the ground surface by means of a touch display of a mobile device, such as a smartphone, and/or a fixedly installed device, for example with a display in the towing vehicle or in the trailer.

With a camera system which is coupled mechanically to a towing vehicle, for example behind the disk with a known position and pose, and with known design-related kinematics and dynamics, for example with an inertial measuring unit (IMU), which detects a current dynamics with a spatial combination of a plurality of inertial sensors, such as acceleration sensors and rotation rate sensors, and with a known position of the wheels of the trailer, a longitudinal and transverse inclination of the trailer can also be determined, in particular in advance, for a trip along a trajectory. A current position of the wheels of the trailer can also be determined or derived by using images of a rear camera of the towing vehicle by deducing the wheel position from the shape and position of the trailer, of which only portions can be recognized, for example.

From the known kinematics of a combination of towing vehicle and trailer, starting from a current location and pose of the combination, it is possible to predict and display trajectories and location points of the wheels of the trailer that lead to contact points with as identical a topographic elevation as possible. For example, in a graphical representation, portions of a trajectory in which the trailer would have a largely horizontally aligned axle could be marked by means of a display. In the case of a plurality of adjacent trajectories, regions in which the trailer has a largely horizontally aligned axle can also be marked.

If the combination and/or the trailer has an ADA system (advanced driver assistant) for automatic driving and/or maneuvering, automatic driving and parking of the combination or of the trailer can take place, which parks the trailer as horizontally or levelly as possible, for example after setting a target region such as an environment of a supply pylon and/or contact points in a target region.

If the trailer has its own drive, such as a mover, the trailer can automatically follow a trajectory previously determined with the method for aligned parking, and/or the corresponding trajectory to the pair of target positions is provided and/or represented graphically to a user.

Advantageously, the method for aligned parking of the trailer can easily and efficiently achieve quick, aligned parking of the trailer without further alignment effort. Parking a trailer as horizontally as possible can thus be supported on the basis of images of optical cameras.

In particular, according to an example embodiment of the present invention, the method can be realized by means of a smartphone. In addition to a target region, a user of the method can use the smartphone to detect a towing vehicle and/or a trailer in order to localize it. During maneuvering, the camera of the smartphone should then have the towing vehicle or the trailer in the field of view, or the smartphone is fixed at a location on or in the towing vehicle and/or on the trailer.

According to an example embodiment of the present invention, for aligning the trailer in the longitudinal direction, the method can be expanded by a contact point for a support wheel of the trailer with a known or specified height or height of a trailer coupling above ground, or correspondingly for multi-axle trailers.

Optionally or additionally, according to an example embodiment of the present invention, the method can be improved by further cameras on the towing vehicle and/or on the trailer and/or an infrastructure whose data or images are fused, since, in particular in the case of redundant fields of vision, other perspectives of the scene are possible, which can contribute to image improvement and accuracy, or an increased detection rate, by means of an image fusion.

By means of the multitude of optical images of a relevant scene, it is possible to generate for a user of the method, in a manner corresponding to a virtual camera, a different perspective than one through the position and pose of the cameras and/or alignment displays, by transforming image data and map data, in particular by rotating and/or shifting and/or zooming them, or transforming them into different coordinate systems. For this purpose, the user of the method can, for example, "move" per touch display in a map which represents the topography of the scene and/or of the ground surface.

According to one aspect of the present invention, it is provided that the topography of the ground of the environment of the trailer is determined by means of at least two optical images of the ground surface of the environment of the trailer and/or radar images of the ground surface of the environment of the trailer and/or lidar images of the ground surface of the environment of the trailer.

With these different imaging systems, the method can be adapted to different circumstances.

In particular, the topography of the ground surface can be determined by means of a first camera system, which is mechanically coupled to the towing vehicle, and/or a second camera system, which is mechanically coupled to the trailer.

According to one aspect of the present invention, it is provided that the at least two optical images of the ground surface of the environment of the trailer are based on a stereo image of the ground surface of the environment of the trailer and/or are based on at least two images of the ground surface of the environment of the trailer, wherein the at least two images image the ground surface of the environment of the trailer from different perspectives in order to determine the topography of the ground of the environment of the trailer.

Such a stereo image of the ground surface of the environment of the trailer can be generated by means of a stereo camera.

According to one aspect of the present invention, it is provided that the method determines at least one trajectory that connects a current position of the at least two wheels of the trailer to the at least one pair of target positions, for aligned parking of the trailer. Advantageously, different applications can use these trajectories in order, for example, to display a deviation from such a trajectory and/or to guide the trailer to the pair of target positions in an automated manner.

Since various trajectories are possible in the case of a single-axle, uncoupled trailer, a previous target region definition and/or a specified maximum slope and/or a maximum lateral inclination is an advantageous option of the method. Such an input along with a display of the map with the topography of the ground surface, with actual and target trajectories and/or target position for contact points that are as horizontal as possible, or contact regions that are as horizontal as possible, can be realized by means of a mobile device.

According to an example embodiment of the present invention, instead of a maximum slope specification, a load calculation for the trailer over a predicted trajectory can also be determined and/or optionally displayed and/or can be compared to different possibilities of maneuvering, either manually and/or with an electric axle and/or a mover and/or a towing vehicle, in order to avoid getting stuck or rolling backward or tilting, for example. In particular in the case of manual maneuvering, the display of the trajectory with the smallest slope or force requirement is helpful.

Impermissible or possibly specifiable maximum slopes and/or maximum lateral inclinations of the combination, but in particular of the trailer, can thus be avoided.

If the trailer is maneuvered in the combination all the way to the parking space, it is also possible to display only the trajectories predicted from the steering angle of a towing vehicle, in addition to the contact points that are as horizontal as possible. If the user of the method does not find any contact points that are as horizontal as possible, the user can change a steering angle of the towing vehicle until at least two parallel contact points in a desired region are displayed on a predicted trajectory by means of a display.

According to one aspect of the present invention, it is provided that the at least one trajectory is determined by determining a trajectory that connects the current position of the at least two wheels of the trailer to the at least one pair of target positions with a minimum of ground unevenness and/or an optimized slope profile in the topography of the ground surface.

Advantageously, with a trajectory optimized in this way, a user of the method can guide the trailer with minimum effort to the desired target position.

According to one aspect of the present invention, it is provided that the distance of the contact points of the at least two wheels of an axle of the trailer is determined by means of triangulation on the basis of at least two images of the wheels of the trailer, wherein the at least two images were generated with different perspectives onto the at least two wheels.

As a result, the method can easily be adapted to different trailers and circumstances, even if not all data of the trailer with respect to the distance of the contact points of the at least two wheels are known.

According to one aspect of the present invention, it is provided that the at least one pair of target positions and/or the trajectory is provided by means of a graphical display.

According to one aspect of the present invention, it is provided that a target position can be selected by a user of the method by means of the graphical display.

According to one aspect of the present invention, it is provided that a three-dimensional environment of the trailer along the at least one trajectory is determined on the basis of at least two environment images, and the at least one trajectory is determined on the basis of a three-dimensional extent of the trailer for parking the trailer.

As a result, it can also be taken into account that a combination and/or a trailer with its external dimensions does not collide with objects or obstacles in the vicinity of a predicted trajectory and the target positions.

Such obstacles on or in the vicinity of a trajectory in the environment of the trailer, such as infrastructure and/or supply pylons and/or manhole covers and/or stones and/or curbstone edges, etc., can be recognized by means of object recognition and classification and can be entered into the map with the topography of the ground surface and displayed.

According to one aspect of the present invention, it is provided that the at least one trajectory is transmitted to a control device of the trailer, wherein the control device is configured to guide and/or maneuver the trailer along the trajectory on the basis of data of an odometry system of the trailer.

If the map with the topography of the ground surface is transmitted to a corresponding system of the trailer, it is possible, even after uncoupling, to determine, for example by means of the odometry in the trailer, the movement and position of the trailer in this map, starting from the last position and pose of the combination determined by means of the camera, i.e., the position and pose and the contact points and thus the transverse inclination of the trailer are still known and can be predicted depending on the planned trajectory.

A system for aligned parking of a trailer is provided according to the present invention, which system contains at least one imaging system, and a data processing device that is coupled in terms of signals to at least one imaging system. The data processing device with a computing unit and/or a system-on-chip is configured to determine a topography of a ground surface of an environment of the trailer, and to determine at least one pair of target positions on the ground surface of the environment of the trailer, on the basis of a provided distance of contact points of the at least two wheels of an axle of the trailer, and on the basis of the topography of the ground surface of the environment of the trailer, for transversely aligned parking of the trailer. The data processing device has an output for providing the at least one pair of target positions, for aligned parking of the trailer.

According to one aspect of the present invention, it is provided that the imaging system of the system for aligned parking is mechanically coupled to the trailer and/or is mechanically coupled to a towing vehicle of the trailer; and/or is a portable imaging system with mobile data processing and mobile data transmission; and the imaging system is an optical system and/or a radar system and/or a lidar system; and the imaging system is configured to provide data for determining the topography of the ground surface of the environment of the trailer to the data processing device.

According to one aspect of the present invention, it is provided that the output of the data processing device of the system for aligned parking is coupled to a graphical display in order to graphically provide the at least one pair of target positions.

According to one aspect of the present invention, it is provided that the data processing device of the system for aligned parking is configured to determine at least one trajectory for aligned parking of the trailer, wherein the trajectory connects a current position of the at least two wheels of the trailer to the at least one pair of target positions.

According to one aspect of the present invention, it is provided that the system for aligned parking has an electric drive, which is configured to be mechanically coupled to the trailer in order to maneuver the trailer along the at least one trajectory to the at least one pair of target positions.

BRIEF DESCRIPTION OF THE DRAWING

Exemplary embodiments of the present invention are illustrated with reference to FIG. 1 and explained in more detail below.

FIG. 1 outlines a topography of an uneven ground surface of an environment with trajectories for two wheels of an axle.

DETAILED DESCRIPTION OF EXAMPLE EMBODIMENTS

FIG. 1 schematically outlines contour lines 100 of the topography of an uneven ground surface of an environment along with trajectories 112, 114 for two wheels of an axle. Different dashed lines denote different altitude ranges of the contour lines 100. A dot-dashed line characterizes a neutral altitude range with a base level; a solid line characterizes a ground relief that is 10 cm to 20 cm lower; bold, interrupted lines denote a ground relief that is 10 cm higher; and lines having two elongated interruptions denote a ground relief that is between 10 cm and 20 cm higher.

The contour lines 100 of the topography were generated with a multitude of optical images from a video sequence of a stereo camera and were generated by means of an image depth measurement or a distance measurement according to a disparity principle of the stereo camera. The stereo camera was mechanically coupled to a towing vehicle and the self-movement of the towing vehicle was compensated using conventional methods, such as acceleration sensors and/or position sensors. FIG. 1 clearly shows a channel in the topography along which the two trajectory lines 112, 114 were planned. These two parallel trajectory lines 112, 114, which run to the rear central image region, represent predicted wheel tracks at a current steering angle, i.e., the wheels of the towing vehicle would follow the shown elevation profile of the trajectory lines 112, 114 (augmented reality). A corresponding elevation curve of an elevation h over a trajectory path x of the trajectories 120, 130 is shown separately as diagrams in FIG. 1.

The invention claimed is:

1. A method for aligned parking of a trailer, comprising:
   determining a topography of a ground surface of an environment of the trailer;
   determining a distance of contact points of at least two wheels of an axle of the trailer;
   determining at least one pair of target positions on the ground surface of the environment of the trailer, for transversely aligned parking of the trailer, based on the distance of the contact points of the at least two wheels of the axle of the trailer and the topography of the ground surface of the environment of the trailer;
   providing the at least one pair of target positions, for aligned parking of the trailer;
   determining at least one trajectory that connects a current position of the at least two wheels of the trailer to the at least one pair of target positions, for aligned parking of the trailer; and
   maneuvering the trailer along the at least one trajectory to the at least one pair of target positions, using an electric drive which is mechanically coupled to the trailer.

2. The method according to claim 1, wherein the topography of the ground of the environment of the trailer is determined using: (i) at least two optical images of the ground surface of the environment of the trailer, and/or (ii) radar images of the ground surface of the environment of the trailer, and/or (ii) lidar images of the ground surface of the environment of the trailer.

3. The method according to claim 2, wherein the at least two optical images of the ground surface of the environment of the trailer are: (i) based on a stereo image of the ground surface of the environment of the trailer and/or (ii) based on at least two images of the ground surface of the environment of the trailer, wherein the at least two images image the ground surface of the environment of the trailer from different perspectives in order to determine the topography of the ground of the environment of the trailer.

4. The method according to claim 1, wherein the at least one trajectory is determined by determining a trajectory that connects the current position of the at least two wheels of the trailer to the at least one pair of target positions with a minimum of ground unevenness and/or an optimized slope profile in the topography of the ground surface.

5. The method according to claim 1, wherein the at least one pair of target positions and/or the at least one trajectory is provided using a graphical display.

6. The method according to claim 1, wherein a three-dimensional environment of the trailer along the at least one trajectory is determined based on at least two environment images, and the at least one trajectory is determined based on a three-dimensional extent of the trailer for parking the trailer.

7. The method according to claim 1, wherein the at least one trajectory is transmitted to a control device of the trailer, wherein the control device is configured to guide and/or maneuver the trailer along the trajectory based on data of an odometry system of the trailer.

8. A method for aligned parking of a trailer, comprising:
   determining a topography of a ground surface of an environment of the trailer;
   determining a distance of contact points of at least two wheels of an axle of the trailer;
   determining at least one pair of target positions on the ground surface of the environment of the trailer, for transversely aligned parking of the trailer, based on the distance of the contact points of the at least two wheels of the axle of the trailer and the topography of the ground surface of the environment of the trailer; and
   providing the at least one pair of target positions, for aligned parking of the trailer,
   wherein the distance of the contact points of the at least two wheels of an axle of the trailer is determined using triangulation based on at least two images of the wheels of the trailer, wherein the at least two images were generated with different perspectives onto the at least two wheels.

9. A system for aligned parking of a trailer, comprising:
   at least one imaging system;
   an electric drive; and
   a data processing device which is coupled in terms of signals to at least one imaging system, the data processing device including a computing unit and/or a system-on-chip being configured to:
      determine a topography of a ground surface of an environment of the trailer;
      determine at least one pair of target positions on the ground surface of the environment of the trailer, based on a provided distance of contact points of the at least two wheels of an axle of the trailer; and based on the topography of the ground surface of the environment of the trailer, for transversely aligned parking of the trailer; and
      determine at least one trajectory for aligned parking of the trailer, wherein the at least one trajectory connects a current position of the at least two wheels of the trailer to the at least one pair of target positions,
      wherein the data processing device has an output configured to provide the at least one pair of target positions, for aligned parking of the trailer, and
      wherein the electric drive is configured to be mechanically coupled to the trailer to maneuver the trailer along the at least one trajectory to the at least one pair of target positions.

10. The system according to claim 9, wherein:
   the imaging system: (i) is mechanically coupled to the trailer, and/or (ii) is mechanically coupled to a towing vehicle of the trailer, and/or (iii) is a portable imaging system with mobile data processing and mobile data transmission, and the imaging system is an optical system and/or a radar system and/or a lidar system, and the imaging system is configured to provide data for determining the topography of the ground surface of the environment of the trailer to the data processing device.

\*   \*   \*   \*   \*